Feb. 13, 1968  H. H. AIKEN ET AL  3,368,675
AUTOMATIC X-RAY APPARATUS FOR CRYSTAL Z-AXIS
ORIENTATION DETERMINATION AND SORTING
Filed Oct. 4, 1965  7 Sheets-Sheet 1

INVENTORS
HOWARD H. AIKEN
ROBERT W. BIRRELL
DONALD A. KERKESLAGER
LEROY K. SITES, JR.

BY *Hughes, Rothwell, Mion,*
*Zinn & macpeak*
ATTORNEYS

Feb. 13, 1968         H. H. AIKEN ET AL         3,368,675
AUTOMATIC X-RAY APPARATUS FOR CRYSTAL Z-AXIS
ORIENTATION DETERMINATION AND SORTING
Filed Oct. 4, 1965         7 Sheets-Sheet 3

INVENTORS
HOWARD H. AIKEN
ROBERT W. BIRRELL
DONALD A. KERKESLAGER
LEROY K. SITES, JR.

BY *Sughrue, Rothwell, Mion, Zinn & Macpeak*
ATTORNEYS

United States Patent Office 3,368,675
Patented Feb. 13, 1968

3,368,675
AUTOMATIC X-RAY APPARATUS FOR CRYSTAL Z-AXIS ORIENTATION DETERMINATION AND SORTING
Howard H. Aiken and Robert W. Birrell, Carlisle, Donald A. Kerkeslager, Boiling Springs, and Leroy K. Sites, Jr., New Bloomfield, Pa., assignors to Aiken Industries, Inc., a corporation of Delaware
Filed Oct. 4, 1965, Ser. No. 492,671
8 Claims. (Cl. 209—111.5)

ABSTRACT OF THE DISCLOSURE

Automatic X-ray apparatus for determining Z-axis orientation of quartz crystal wafer blanks includes a feed mechanism for feeding blanks from a magazine to a mounting station on an oscillatable table. Vacuum holds each wafer at the mounting station and air pressure blows each wafer through a chute into a tree-type sorter. Electrical control circuitry includes a digital encoder and cam operated switches driven with the oscillatable table and a photocell detector in the chute, as well as an error detecting circuit mechanically connected to the sorter.

---

This invention relates to an entirely automatic apparatus for using known X-ray techniques to determine the angular orientation of the Z or electrical axis of a crystal wafer blank and to automatically sort the blank in accordance with this determination.

The crystal wafer blanks processed by the machine of this invention are thin quartz wafers of the type used in electronic frequency control and filtering applications. The angle of the Z-axis to the surface of a crystal wafer blank has an important effect on a number of parameters of the crystal and this angle needs to be known as precisely as possible for the particular use or application of the crystal blank. For example, the greatest activity of a crystal will occur in a crystal cut at a known angle to the Z-axis. Also, the least change in frequency over a given temperature range will occur at a Z-axis angle which may possibly be different from the angle of greatest activity. The size of the crystal and other factors as known in the art and literature also enter into the determination of the best angle of the Z-axis for a particular electronic application of the crystal.

A user of a crystal for electronic frequency control and filtering applications must know as precisely as possible the angle of the Z-axis, depending upon the particular use or application of the crystal. Many of the users of crystals require determination of the Z-axis orientation angle to an accuracy of ±½ minute. The apparatus of this invention provides not only for automatically determining the Z-axis angle but determining it with an accuracy of considerably greater than ±½ minute, for example, ±¼ minute of arc.

Before this invention, the conventional method of determining the angle of orientation of the Z-axis of a crystal wafer blank was to use an X-ray diffraction method with a skilled operator manually oscillating each crystal wafer blank through a predetermined angle and during the rotation visually ascertaining a peak in the response of the X-rays. The operator then noted the angular orientation at which the peak occurred and manually removed the crystal and placed it in a sorting box in accordance with the peak response angle. Even the most skilled oeprator utilizing the best prior art X-ray double diffraction units had far less than 100% accuracy in their results. The machine of this invention is entirely automatic and error checking to provide a greater degree of accuracy.

This invention provides for automation of the conventional prior art method discussed above by automatically determining the peak response as the wafer is automatically driven by a motor through a predetermined angle and further automatically sorting the wafer blank after the peak has been determined, the sorting being into a bin in accordance with the angle of rotation at which the peak occurred.

It was also known prior to this invention to automatically sort crystals using X-ray diffraction, an oscillatable table with a switching bank, and an X-ray detector. A serial multibin sorter with normally closed entrance gates was utilized to sort the crystal wafer blanks within a tolerance of ±2 minutes of arc.

This prior art crystal wafer blank sorter, although an improvement over manual operation, was only semi-automatic, and was still not adaptable to automatic blank feed or high tolerance sorting directly from a detecting station into as many as 64 sorting bins to provide sorted blanks within an accuracy of ±¼ minute of arc.

In general, this invention is practiced on the base of a known commercial X-ray machine such as has been used by the skilled operators in the previously manual operations discussed above. On this X-ray machine there is provided a means for automatically feeding crystal wafer blanks one at a time with the +X-axis oriented to a Z-axis determining position. At the Z-axis determining position the crystal wafer blanks are held by vacuum after being tapped into place and a swinging arm of the X-ray machine is automatically motor-driven through a predetermined angle. During this angular drive, a shaft encoder provides an output signal indicating the degree of rotation in digital form. During the angular drive of the arm of the X-ray machine, the wafer blank is also swung through an angle as doubly diffracted X-rays are reflected from it. The X-rays reflected from the crystal planes of the blank are detected by a radiation detector, the electrical output of which is amplified and fed to a peak sensing circuit. At the peak of the sensed reflected X-rays the peak sensing circuit produces a pulse which is digitally encoded by the shaft encoder, thus indicating digitally the angle of rotation at which the maximum peak occurs. This digital signal from the shaft encoder is used to operate logic circuitry which in turn controls a tree type sorter to sort the wafer blanks into one of a large number of bins in accordance with the determined angle of the Z-axis to an accuracy much greater than ±½ minute of arc.

Other objects of the invention will be pointed out in the following description and claims and illustrated in the accompanying drawings, which disclose by way of example, the principle of the invention and the best mode which has been contemplated of applying that principle.

Figure 1:
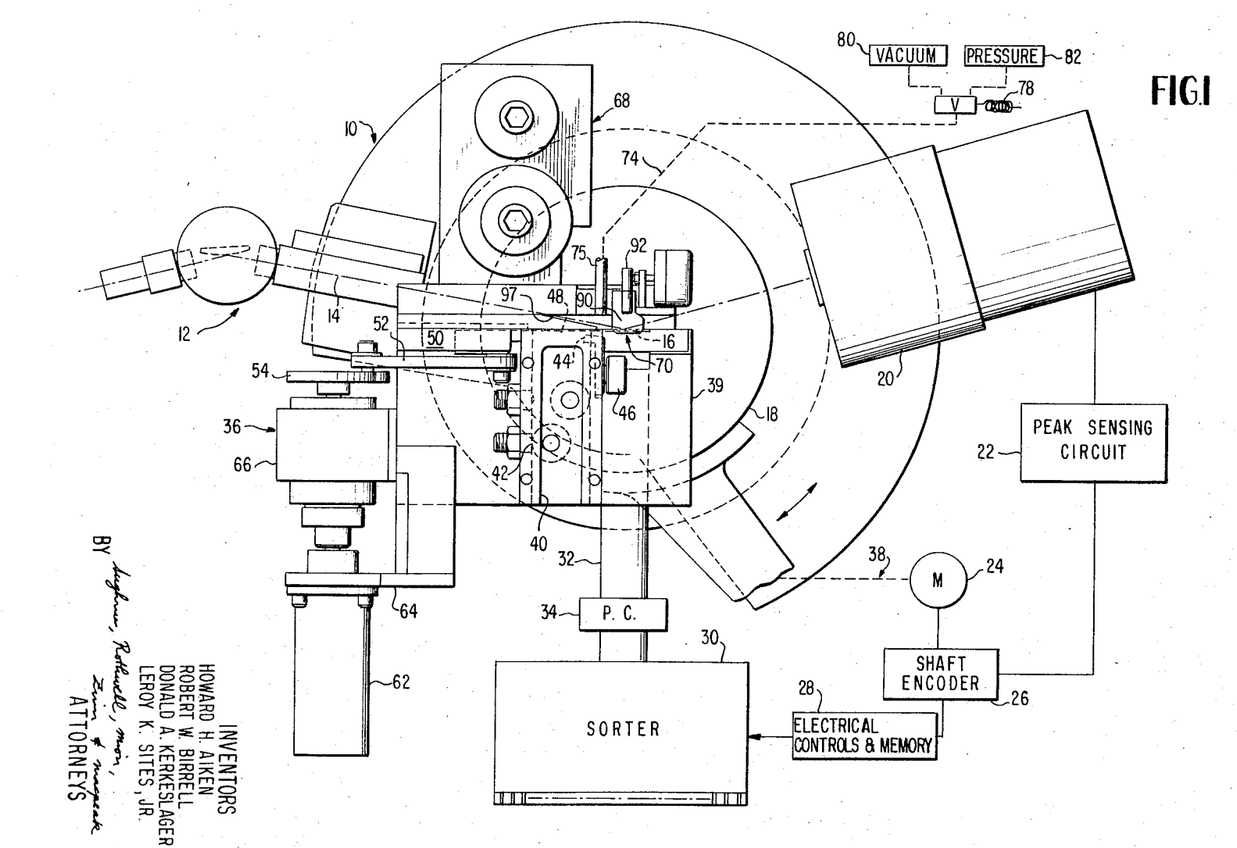
FIGURE 1 is a plan view of this invention as applied to an X-ray machine and showing certain features of the invention schematically or in block form.

Referring to FIGURE 1, there is shown the general arrangement of this invention. The invention is applied to a known commercial X-ray machine 10, such as a commercially available G.E. X-ray machine. The machine includes a double diffraction X-ray source 12 for directing a collimated beam of X-rays toward crystal wafer blanks 16 as these wafer blanks are rotated through a predetermined angle by virtue of an oscillatable table 18. The X-rays 14 reflect off the crystal planes of the wafer blank and reflected X-rays are detected by a radiation detector 20. The machine as described thus far is that generally available and used for Z-axis determinations by skilled workers in the art, the rotation of oscillatable table 18 being manual and the radiation detector 20 providing a visual indication of the reflected radiation.

As discussed above, this invention completely automates the manual operation with all the attendant advantages of such automation. The signal picked up by the radiation detector 20 is fed to a peak sensing circuit 22 for sensing the peak radiation detected during the angular movement of the oscillatable table 18. The oscillatable table 18 is driven by a drive motor 24 and this motor at the same time drives shaft encoder 26. At the peak sensed by the peak sensing circuit a pulse is fed to the shaft encoder to provide an encoded digital signal indicative of the position of oscillatable table 18 at which the peak in the sensed radiation occurred (and hence angular orientation of the Z-axis). This signal is passed to electrical controls and memory 28 which at an appropriate time feeds this digital information to sorting assembly 30 The sorter is preferably of the digitally operated tree type with 64 sorting bins as disclosed in application Ser. No. 433,736, filed Feb. 18, 1965, now U.S. Patent No 3,294,210, and assigned to the assignee of this application, and reference may be had thereto for a more detailed description.

After crystal wafer blank 16 has had its angle to the Z-axis determined, it is removed from its measuring position by air pressure and passes down chute 32 to the sorter 30. A photocell 34 determines if and when the detected wafer blank passes through the chute 32 into the sorter 30.

Figure 2:
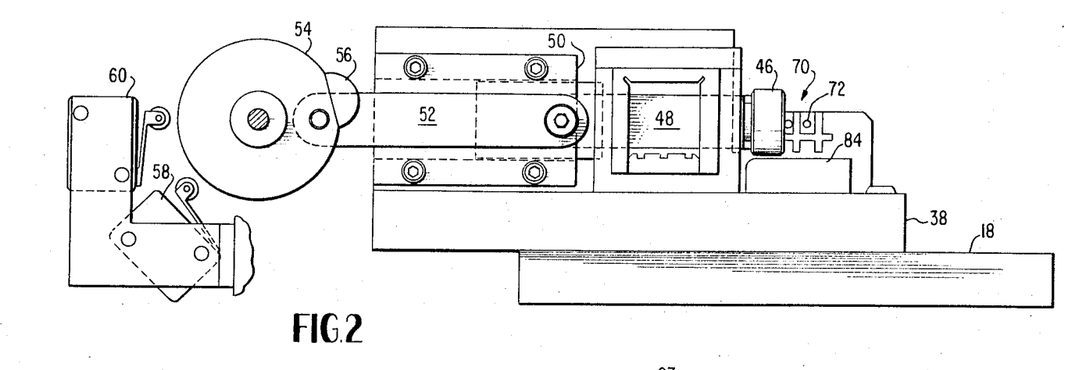
FIGURE 2 is a front elevation view of a blank feeding portion of the apparatus for feeding blanks consecutively to a measuring station.
Figure 3:
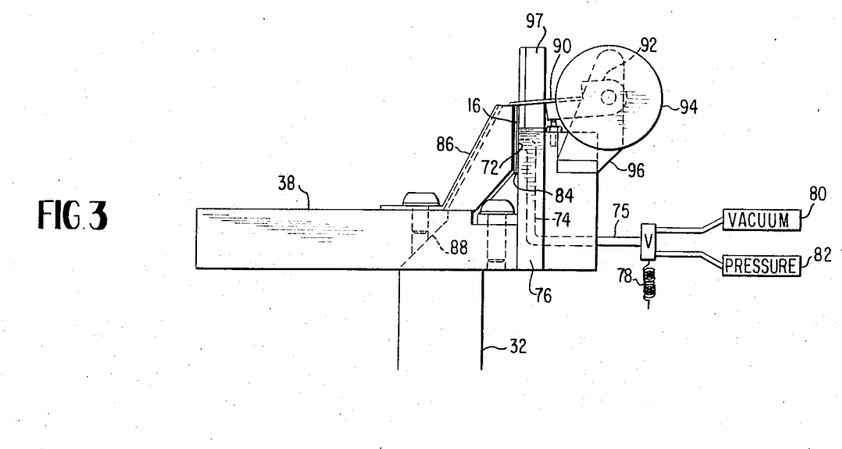
FIGURE 3 is an end elevation view of the blank measuring station and showing the positioning of the crystal thereat.

For automatically feeding the crystal wafer blanks one at a time to the measuring position at the blank station there is provided an automatic feed assembly 36 which is shown in more detail in FIGURES 2 and 3. The mechanical interconnection between the motor 24 and the oscillatable table 18 is table drive assembly 38 which is also shown in more detail in FIGURES 4, 5 and 6.

The automatic feed assembly and the crystal wafer blank station are mounted on the oscillatable table 18 and carried on a base plate 39. This base plate supports a magazine nest 40 for receiving a magazine of crystal wafer blanks with each blank in the magazine having its +X-axis similarly oriented. A magazine suitable for use in nest 40 would be one similar to that disclosed in application Ser. No. 427,692, filed Jan. 25, 1965, and assigned to the assignee of this invention. The +X-axis of each crystal wafer blank may be determined, sorted and marked in accordance with the teachings of application Ser. No. 427,574, filed Jan. 25, 1965, and assigned to the assignee of this invention. The magazine insertable in nest 40 has an open bottom so that the blanks can be fed one at a time from the bottom of the magazine. A plurality of spring detents 42 are provided in the side of the nest to hold the magazine in place. At one end of the nest 40 there is a feed gate finger 44 which is adjustable axially of the nest 40 by adjusting screw 46. The adjusted position of finger 44 determines the thickness of the blank which can pass it. Quite obviously the finger 44 would be adjusted to allow a single blank at a time to pass from the end of the magazine in nest 40 to the blank measuring position where crystal wafer blank 16 is shown in FIGURE 1.

For feeding the blanks one at a time from the magazine in nest 40 to the position of blank 16 in FIGURE 1, there is provided a reciprocable, thin, feed blade 48, see FIGURE 2, which is guided for reciprocating movement by suitable guide blocks 50. Reciprocation is obtained by a crank and pitman arrangement including connecting rod 52 pivotally connected to the blade 48 and to a cam-crank 54. Cam-crank 54 also includes a cam lobe 56 for actuating microswitches 58 and 60 for timing and control purposes as will be described in connection with the timing and circuit diagrams.

For driving the feed blade 48 there is provided a feed motor 62, FIGURE 1, held by motor support bracket 64 which in turn is attached to base plate 39. A magnetically operated slip clutch 66 is provided in the drive train between the motor 62 and the cam-crank 54 so that energization of the clutch causes feed of the blank, but if anything jams, the clutch will slip and the motor can continue to operate without breaking any of the components. A negator spring assembly 68 is provided with a cable (not shown) which in turn is connected to the outermost crystal in the crystal magazine to bias all of the crystals at a constant pressure toward the bottom of the magazine for their being fed by the feed finger 48 into the crystal blank station 70.

For holding the crystal in its blank station 70 there is provided a vacuum hold down arrangement, including fluid openings 72 connected to fluid passages 74 in crystal holding block 76, see FIGURES 2 and 3. Passages 74 extend outwardly in conduit 75 as shown in FIGURES 1 and 3 and this conduit includes a three-way solenoid actuated valve 78 for applying either vacuum from vacuum source 80 or air pressure from pressure source 82 selectively to the openings 72. Obviously, when vacuum is applied to openings 72 and crystal wafer blank 16 is in position 70, the blank will be held against the wall of the manifold block. At the end of a measuring operation when it is desired to remove the blank the solenoid valve 78 is operated to apply air pressure from pressure source 82 and blow the crystal wafer blank 16 away from its position, and off of supporting ledge 84, into hood 86 through passage 88 from where it passes down through chute 32 into the sorter 30, see FIGURES 3 and 1.

For assuring that the crystal wafer blank 16 is securely seated on ledge 84 when in its measuring position at station 70, there is provided a tapping plate 90 for tapping on the top edge of the crystal wafer blank. The tapping plate 90 is attached to a lever 92 which in turn is oscillated by a rotary solenoid 94 supported by bracket 96. After the wafer 16 is fed into station 70 it is lightly tapped by tapping plate 90 under the control of rotary solenoid 94 to assure that it is securely seated in position to allow the X-rays to be reflected while it is in perfect reference position. It is noted that the crystal holding block 76 has a portion 97 cut away to allow the X-rays 14 to have a free path to the crystal wafer blank 16 at station 70. See FIGURES 3 and 1.

Figure 4:
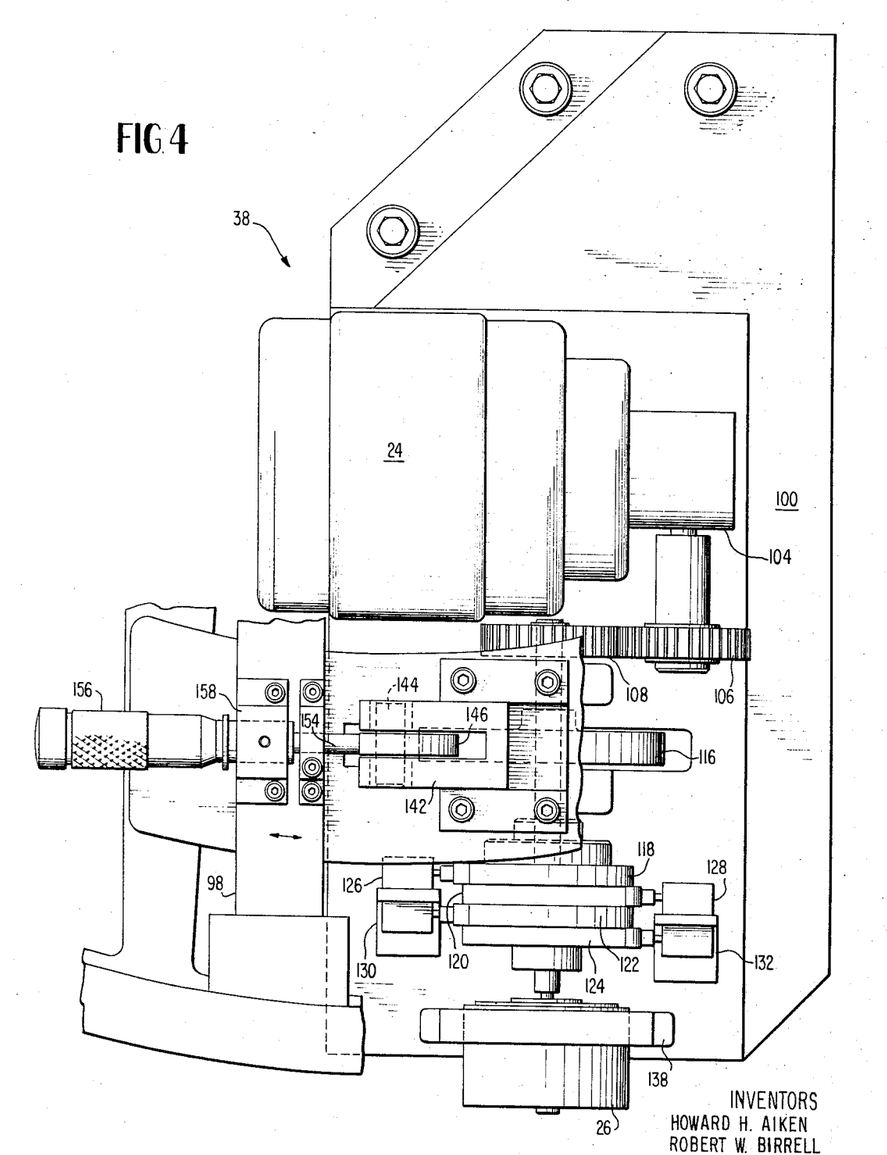
FIGURE 4 is a plan view of the apparatus for driving the measuring table through a predetermined angle and also showing arrangements of portions of the electrical circuit and the physical location of a shaft encoder.
Figure 5:
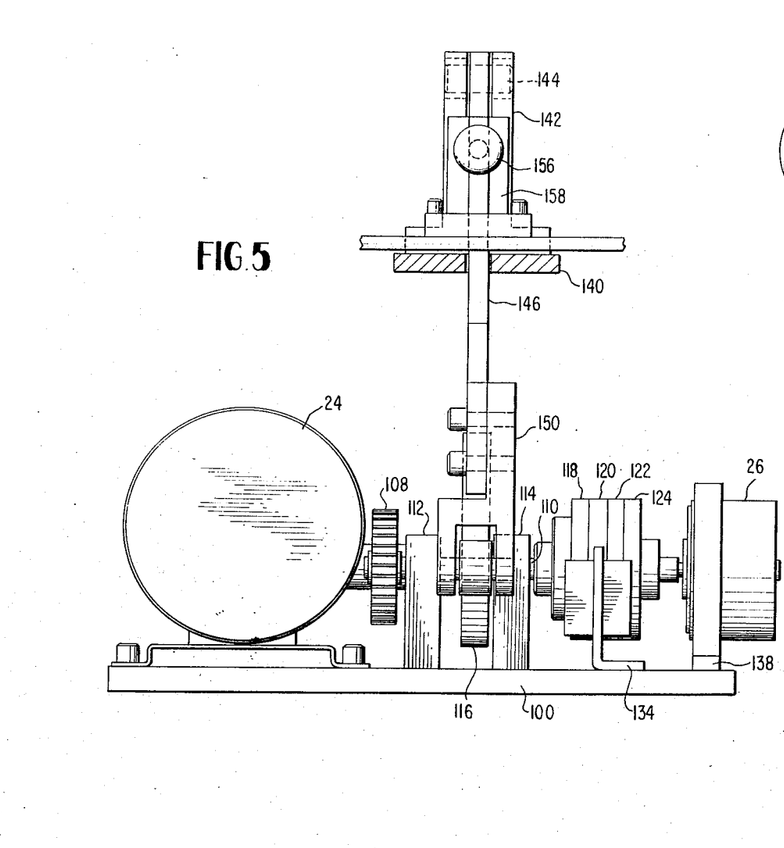
FIGURE 5 is an elevational view of the table feed apparatus shown in FIGURE 4.
Figure 6:
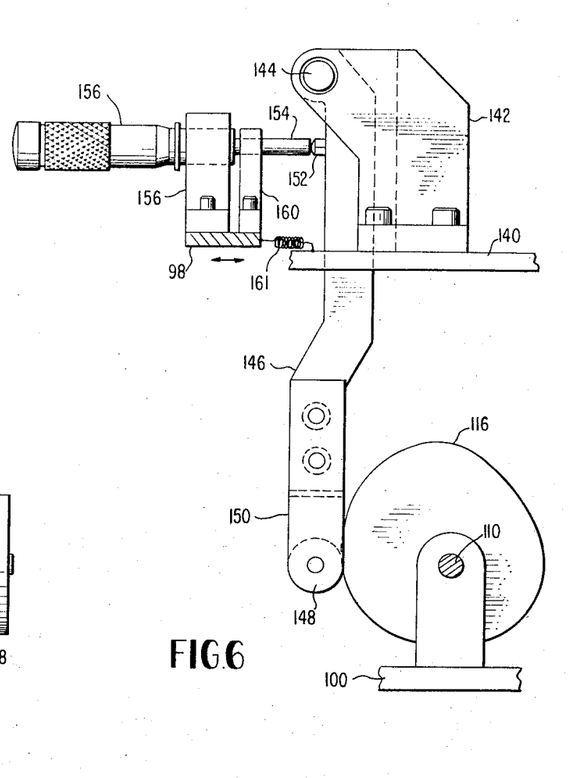
FIGURE 6 is an end elevational view of the table drive apparatus shown in FIGURES 4 and 5.

The automatic drive assembly 38 for driving the oscillatable table 18 is shown in detail in FIGURES 4, 5 and 6. The oscillatable table 18 includes an extending arm 98 as shown in FIGURE 4. The drive assembly 38 for oscillating this arm 98 and hence the table 18 is carried by support 100 which is rigidly attached to the base of the X-ray machine 10. Supported on base 100 is an electric drive motor 24 provided with a right angle drive 104 and a pair of spur gears 106, 108. The spur gears shown have a 1:1 drive ratio, but if other drive ratios are used, other pairs of gears could be used at this point. Gear 108 drives a drive shaft 110 which in turn is supported in bearing blocks 112 and 114. A drive cam 116 is rigidly secured to drive shaft 110 for accomplishing the drive of the table. Also secured to drive shaft 110 are a plurality of switch cams 118, 120, 122 and 124 for suitably actuating control switches 126, 128, 130 and 132, respectively. These switches are mounted adjacent the cams on suitable support brackets such as bracket 134, FIGURE 5. The shaft encoder 26 is supported in bracket 138 at the end of shaft 110 to be driven thereby.

A stationary ledge 140 which is rigidly attached to the base of the X-ray machine 10 mounts a pair of uprights 142 which carry a pivot pin 144 for a cam follower lever 146. The cam follower includes a roller 148 carried by roller holder 150 attached to lever 146 as shown in FIGURES 5 and 6. It follows that rotation of cam 116 eccentric about drive shaft 110 will cause pivoting of the cam follower lever 146 about pivot 144. The cam follower lever includes a hardened wear button 152. This button abuts against anvil 154 of a micrometer 156. The micrometer is supported from the movable table arm 98 by bracket 158 and the adjustment of the anvil by the micrometer is locked in place by lock bracket 160. Suitable biasing means, such as spring 161 schematically shown in FIGURE 6, is provided for holding the micrometer anvil 154 against the wear button 152. Oscillation of the cam follower lever 146 will, therefore, cause oscillation of the micrometer and oscillation of table 18 in a very small and precisely determined amount of arc, e.g., 30 to 40 minutes of arc. The micrometer is for adjusting the absolute angle of the center of the arc when the cam 116 drives the table, providing a variable range for the angles of crystals measured. The spring 161 assists in returning the table 18 for the next drive swing through the range of measuring arc.

It can thus be seen that drive motor 24 drives the table 18 through a controlled arc and at the same time encodes in shaft encoder 26 a digital indication of the amount of arc while further timing other operations by means of the cam driven switches 126, 128, 130 and 132 as will be described. The shaft encoder 26 is of a type commercially available and accepts an electrical input to provide an encoded digital output, for example, in a reflected binary (Grey) code, of the angular position of shaft 110 which drives it.

Turning now to the timing diagram of FIGURE 7 combined with the electrical circuit diagrams of FIGURES 8, 9 and 10, these diagrams will be described together with the operation of the entire apparatus. As shown in FIGURE 8, again schematically, drive motor 24 drives shaft 110 which in turn controls four switches 126, 128, 130 and 132, and drives shaft encoder 26. The switches 126, 128, 130 and 132 are used to control the application of a regulated voltage to portions of the circuit. In Order to simplify the circuit diagram, the voltages controlled by switches 126, 128, 130 and 132 have been indicated as A, B, C and D, respectively. The peak sensing circuit 22 may be of a commercially available type and is schematically illustrated at the top portion of FIGURE 8. The bottom portion of FIGURE 8 below the shaft encoder 26 includes holding relays, sorting relays and sorting solenoids as well as an error detecting circuit. The error detecting circuit is shown in more detail in FIGURE 10. FIGURE 9 shows the feed circuits including the circuits for the rotary tapping solenoid 94, the vacuum-air solenoid valve 78 and the photocell interlock including photocell unit 34.

Figure 7:
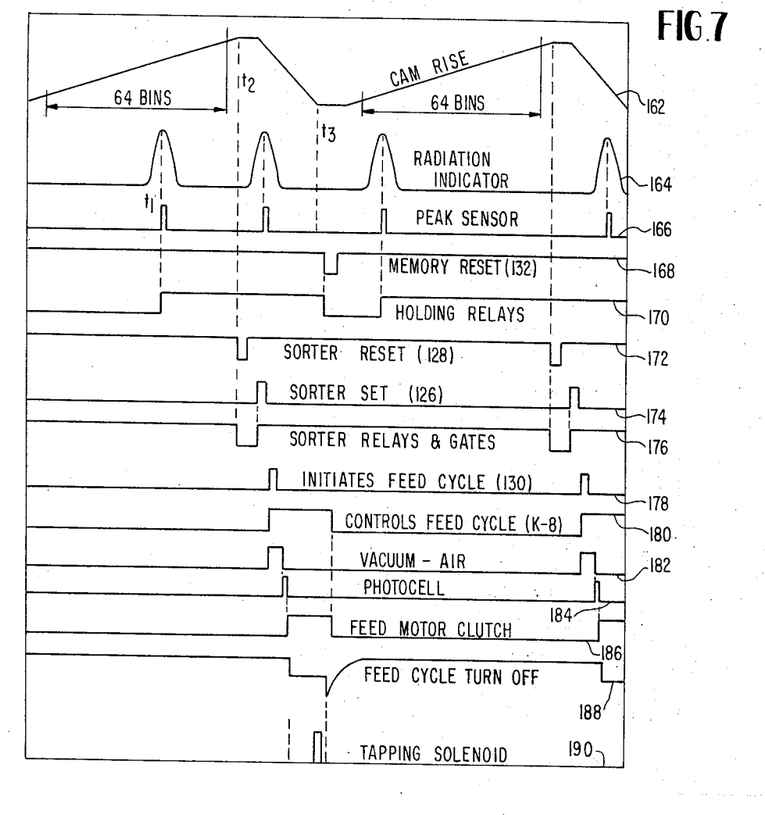
FIGURE 7 is a timing diagram of the timing of the various functions and operations of the machine.

Referring to FIGURE 7, top line 162 illustrates the cam rise during the time cycle and the return. Line 164 indicates the integrated output of radiation indicator 20 which may be a commercially available Geiger-Müller counter and shows that peaks occur at various portions during the cam rise for each blank and also peaks occur during the return. Line 166 indicates the output of the peak sensing circuit 22. Line 168 is the timing diagram for resetting the memory at the end of a cycle. Line 170 is the timing diagram for setting up holding relays in accordance with the sensed peak. Line 172 is the timing diagram for resetting the sorter at the end of a cycle. Line 174 is the timing diagram for setting the sorter after it has been reset preparatory to starting another cycle. Line 176 is the timing diagram for the sorter relays and gates. Line 178 is the timing diagram for initiating the feed cycle. Line 180 is the timing diagram for controlling the feed cycle. Line 182 is the timing diagram for the application of vacuum or air by the solenoid valve 78. Line 184 is the timing diagram for the energization of the photocell circuit 34. Line 186 is the timing diagram for activation of the feed blade 48 by energization of feed clutch 66. Timing line 188 shows the time of turning off of the feed cycle, and the timing line 190 shows the time of energization of the rotary solenoid 94 for tapping crystal wafer blank 16 securely in position at the measuring station 70.

Figure 8:
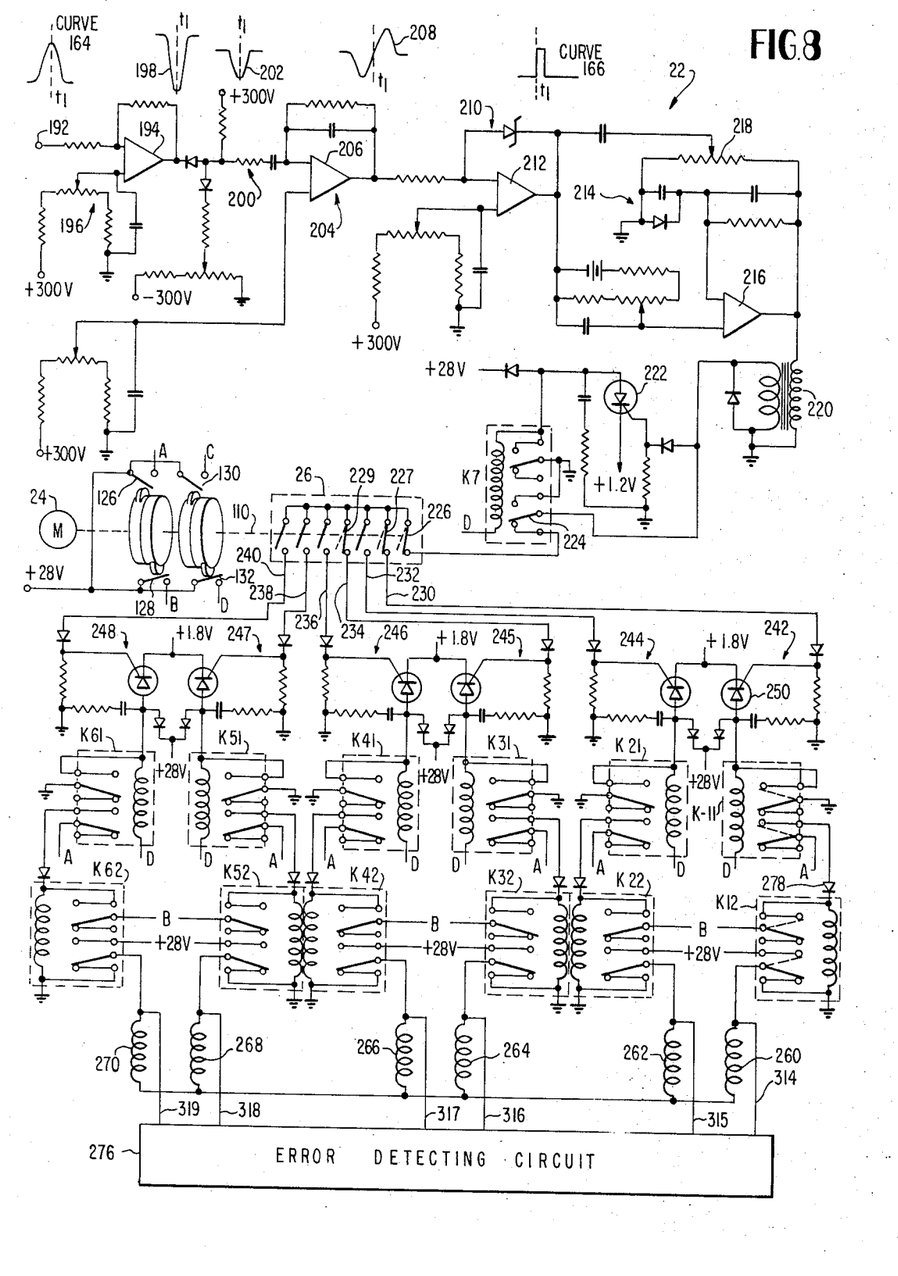
FIGURE 8 is an electrical circuit diagram of a portion of the circuit for the machine.
Figure 9:
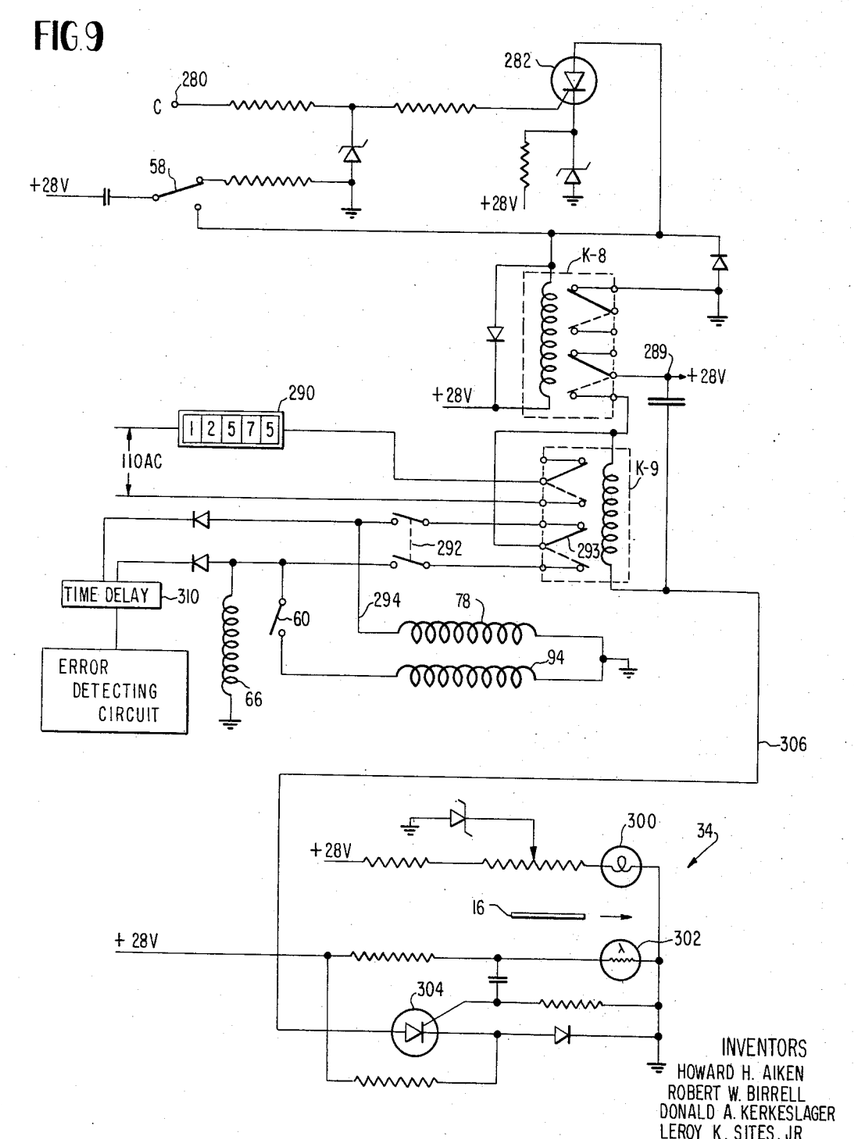
FIGURE 9 is an electriacl circuit diagram of another portion of the circuit of the machine.

Referring now to the peak sensing circuit shown in the top portion of FIGURE 8, voltage is applied to terminal 192 from the output of the radiation detector 20. The shape of this input voltage is shown in curve 164 in FIGURE 7 and immediately above the terminal 192. This voltage is applied to the input of an operational amplifier 194 with its associated bias supply 196. The output from the operational amplifier is indicated by curve 198. Following the operational amplifier there is a variable limiter 200 including the circuit elements shown in FIGURE 8 which passes the portion of the signal 198 below the limiting level and provides an output indicated at curve 202. This threshold is fed then to a differentiator 204 including operational amplifier 206 to provide the differentiated voltage shown in curve 208. From the differentiator the signal is passed to a crossing detector 210, including operational amplifier 212. The crossing detector detects the point of crossing of curve 208 at reference time $t_1$ and provides an output as shown by line 166 in FIGURE 7 and immediately above the crossing detector in FIGURE 8. The output from the crossing detector is fed to a multivibrator 214 including another operational amplifier 216 and an adjustable resistance 218 for controlling the pulse duration.

The output from the peak sensing circuit is passed to transformer 220 provided for impedance matching and the output from transformer 220 operates a control circuit for a silicon controlled rectifier 222 which in turn controls relay K7. The coil of relay K7 has voltage D applied thereto under the control of switch 132. With the relay in its normal condition as shown in FIGURE 8, the peak pulse will pass through the lower set of terminals 224 and on to the terminals of the shaft encoder 26. Control terminals 226 of shaft encoder 26 is used to activate the shaft encoder only for each half revolution and to inhibit for the other half revolution at the time of the cam and table return. During the half revolution that the shaft encoder is not inhibited and terminal 226 is closed, the signal will pass through the shaft encoder and to selective ones of lines 230, 232, 234, 236, 238 and 240 in accordance with a reflected binary or other suitable digital code which corresponds to the rotation of the shaft encoder 26. The switches indicated on the shaft encoder of course are schematic only, but do show the circuit path. As shown, switches 227 and 229 are closed, indicating a precise angular position of shaft 110 and hence of table 18 and and blank 16 at measuring position 70, FIGURE 1 (an angle represented by digital signal 101000). With switches 227 and 229 closed, energy is applied to lines 230 and 234 while nothing will appear on the other lines 232, 236, 238 and 240. Of course, at other angular positions others of the circuits indicated by the switches on the shaft encoder would be closed indicative of the angular position of the blank at the time.

Below the shaft encoder 26 are six identical circuits 242, 244, 245, 246, 247, 248, extending vertically downwardly toward the bottom of FIGURE 8. Since the circuits are identical, only one will be described. The circuit 242 includes an SCR250 which may be selectively turned on by the signals selectively passing through the shaft encoder 26. In the example, terminal 227 passing a signal to circuit 242 would turn on SCR250 thereby energizing relay K11 therebelow. Relay K11 and the other relays K21, K31, K41, K51, K61, of the same horizontal row are holding relays for holding the signal passed through the shaft encoder at the sensed peak. The next lower row of relays in FIGURE 8 are sorting relays, such as relay K12 and other relays K22, K32, K42, K52, K62 of that horizontal row, and these sorting relays in turn energize sorting solenoids, including solenoids 260, 262, 264, 266, 268, 270, selectively according to the detected peak and the angular position of the table at which the peak was detected. The sorting solenoids are utilized to set the mechanical sorting gates of the tree type digital sorter such as that disclosed in aforementioned application Ser. No. 433,736, now U.S. Patent No. 3,294,210. An error detecting circuit 276 is also connected to the circuits leading to the solenoids and is shown in more detail in FIGURE 10. This error detecting circuit detects whether or not the sorting gates have in fact moved when the sorting solenoids are energized or deenergized, or whether or not there was an error in the feed cycle. Between the holding relays such as relay K11 and the sorting relays of K12, there may be isolating diodes such as diode 278, and the others shown.

Assuming a signal applied to line 230 by terminal 227 being closed when the peak appeared, SCR250 would be turned on and switch 132 is energized most of the cycle shown by timing line 168 to apply D voltage to the coil of relay K11. The relay will switch from the unenergized position shown, such that the lower contacts connected to voltage A will move to the other stationary switch point as shown in dotted lines. At an appropriate time in the cycle as indicated by timing line 174 of FIGURE 7, switch 126 will close applying voltage A, which due to the energization of the holding relay K11 will energize sorting relay K12. Energization of relay K12 will cause the relay points to switch to the positions shown in full lines to that shown in dotted lines in FIGURE 8, thus applying the +28 v. to sorting solenoid 260 and operating the corresponding sorting gate in the tree type sorter. This illustration is only for the energization of one of the six sorting solenoids. In the illustration shown solenoid 262 will not be energized because no signal will pass along line 232 through the shaft encoder. Similarly, sorting solenoids 266, 268 and 270 will not be energized in the exemplary condition chosen and solenoid 264 will be energized, through the same but parallel circuits as have been described.

Reference may be had to FIGURE 9 for further description of the electrical controls in the feed operation. The circuit of FIGURE 9 includes the magnetic feed clutch 66, the air vacuum solenoid valve 78, the rotary tapping solenoid 94 and includes the photocell circuit 34. The circuit is primarily under the control of cam operated switches 58 and 60 operated by cam 54, FIGURE 2, with further control provided by the photocell of the circuit 34 and relays K8 and K9. Voltage reference C under the control of switch 130 is applied to input terminal 280 at a selected time in the cycle as shown by timing line 178 in FIGURE 7 to initiate the feed cycle. This voltage turns on SCR282 which in turn controls the energization of relay K8. Energizing relay K8 causes the transfer of the contacts from the full line position shown in the dotted line position. This connects the voltage from point 289 through the coil of relay K9 to the photocell circuit 34, but relay K9 is not actuated until a blank 16 is detected by the photocell circuit. Prior to such detection, voltage from point 289 is applied through blade 293, closed manual switch 292 to the coil of the air-vacuum valve 78 thus initiating the blowing of the crystal blank 16 away from station 70, see timing line 182. The blowing off of the crystal wafer blank 16 from the station 70 is followed by the photocell detecting unit 34 detecting when the wafer blank passes through it since relay K9 is not pulled in until triggered by response from photocell 34 even though relay K8 is energized. The photocell circuit 34 includes a source of illumination such as a light 300 and a light responsive cell such as photocell 302. Passage of the crystal 16 between the light and photocell interrupts the photocell response, although any other suitable arrangement for interrupting the light to indicate the passage of the crystal wafer blank 16 may be used. A response from the cell 302 turns on SCR304 providing an output through conductor 306 to pull in or energize relay K9 switching the contacts to the dotted line position. This indicates that the last crystal blank measured has passed to the sorter and it is all right to feed a new blank into position. Switching relay blade 293 thus energizes feed clutch 66 to cause the feed assembly to feed a new blank into station 70, see timing line 186, FIGURE 7. After a new blank is fed into station 70 the cam 54 closes switch 60 energizing rotary solenoid 94 to tap the new blank firmly into its position, and down against ledge 84, FIGURE 3. A time delay circuit 310 of any suitable type may be utilized to operate an error detecting circuit 312 at any time the photocell did not detect the passage of a crystal 16 or in the event the feed motor drive assembly jams.

Figure 10:
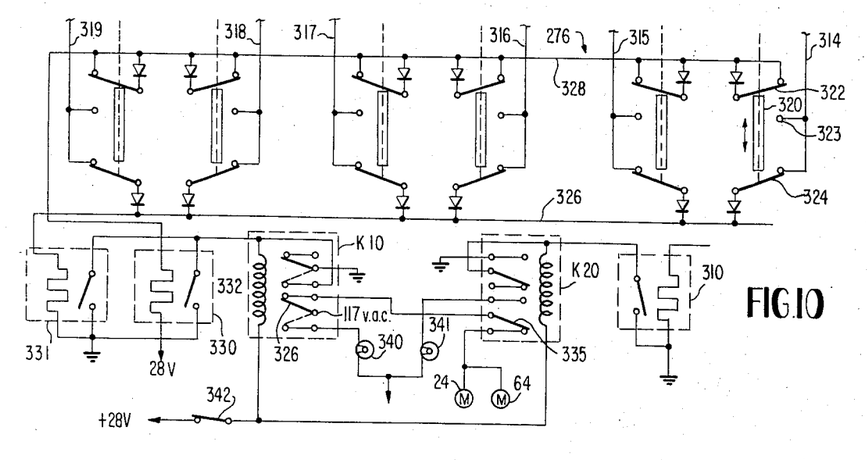
FIGURE 10 is an electrical circuit diagram of the error detecting circuit shown in block form in FIGURE 8.

The error detecting circuit 276 of FIGURE 8 is shown in more detail in FIGURE 10. In FIGURE 10 the electrical conductors 314, 315, 316, 317, 318, 319, leading in from the top are the lines leading into the error detecting circuit 276 of FIGURE 8. Thus, for example, if sorting solenoid 260 is not energized, its corresponding sorting gate indicated by mechanical member 320 should be in the full line position shown. If the sorting gate jams or sticks on return, switch contact 322 would make contact with point 323. This will cause a signal to pass along line 328, to time delay relay 330. After a time delay if the gate 320 does not return relay 330 will apply ground to coil 332 of relay K10, thus switching the contacts of this relay. Contact blade 326 will thereby remove the 117 v. A.C. applied to motors 24 and 64 through contact blade 335 of relay K20 stopping the feed and drive due to gate malfunction. The 117 v. A.C. will then be applied to gate error light 340. If a gate, such as gate 320, is operated voltage goes through blade 324, line 326 to time delay relay 331. Physical movement of the gate, however, will contact blade 324 and open the circuit to time delay relay 331 before it energizes, assuming the gate is operating correctly. Failure of the gate to open causes relay 331 to energize relay K10 and the sequence of operations is as described above, namely the motors 24 and 64 are deenergized and the gate error light 340 is lit. If there is an error in the feed of the blank, that is the photocell circuit does not detect a blank going to the sorter, or if the feed motor jams on feeding the next blank, then time delay relay 310 energizes relay K20 to deenergize motors 24 and 64 and light "feed error" lamp 341. Upon removal of the error reset switch 342 is manually opened to deenergize relays K10 and K20.

To briefly recap the operation of the cycle, energization of the drive motor 24 drives the table 18 through drive cam 116 and cam follower lever 146 and micrometer 156. The feed motor 62 with the energization of the feed clutch 66 causes the feed of the crystal wafer blank by means of thin feed blade 48 into position at station 70 where the blank is held by vacuum applied to holes 72 under the control of solenoid actuated three way valve 78. During the drive of the table 18 through a limited degree of arc the X-rays 14 will be reflected off of the atomic crystal planes and will be received by the radiation indicator 20. At the point of maximum reflection radiation indicator 20 will have a rise in its output which is passed to the peak sensor 22 to provide a thin peak sensed pulse as shown by timing line 166, FIGURE 7. During rotation the shaft encoder 26 provides an output continually changing in digital form indicating the degree of arc at any particular moment. At the time of the sensed peak the output of the shaft encoder in digital form is passed to set up a code indicating this Z-axis angle in holding relays K11–K61. The output from the holding relays is then passed to the sorter relays K21–K62 under the control of switch 126 and the sorter relays energize the gate solenoids 260–270. If energization of a gate solenoid 260 doesn't cause the physical movement of its corresponding sorting gate, error detecting circuit 276 gives an indication thereof and can be utilized to stop the machine. The feed cycle and the transfer to the sorter is all accomplished after the rise and sorting cycle of the cam as shown in FIGURE 7 between lines $t_2$ and $t_3$. Timing switch 130 initiates the feed cycle by causing energization of relay K8 which in turn controls the blowing of the last measured wafer 16 off of station 70 and after the passing of this wafer is indicated by photocell circuit 34, see line 184, the feed motor clutch 66, see line 186, is energized and is later turned off under the control of SCR282 and then relay K8 drops out.

While the invention has been particularly shown and described with reference to a preferred embodiment thereof, it will be understood by those skilled in the art that various changes in form and details may be made therein without departing from the spirit and scope of the invention.

What is claimed is:

1. In a machine for determining the angle of orientation of a piezoelectric crystal wafer blank to its Z-axis, the machine being of a type including a crystal wafer blank mounting station, a driven oscillatable table supporting the mounting station, means for directing X-rays at a crystal wafer blank positioned at the mounting station, means for providing a signal corresponding to the position of the table, radiation detecting means for detecting a peak signal of reflected X-rays from the crystal, and a sorter operated under control of the table position signal and the peak signal for controlling sorting into separate bins; a fully automatic apparatus for determining the angle of orientation and for automatically and accurately sorting the blank with a tolerance of at least ±½ minute of arc into separate receptacles according to the determined angle with the improvements comprising:

(a) a magazine nest mounted on the oscillatable table adjacent the mounting station for holding a magazine containing oriented crystal wafer blanks,
 (b) a controllably driven reciprocal member movable from adjacent one end of the magazine nest to adjacent the mounting station for feeding crystal wafer blanks one at a time from the end of the magazine to the mounting station,
 (c) a fluid passage having one end connected to fluid openings at the mounting station and the other end selectively connected to a source of vacuum and fluid pressure,
 (d) a chute between the mounting station and the sorter, and
 (e) a photocell detector adjacent the chute to determine when a blank has passed through the chute from the mounting station to the sorter.

2. A machine as defined in claim 1 wherein the controllably driven reciprocal member includes a feed blade movable within guides and driven from a feed motor through a selectively energizable slip clutch.

3. A machine as defined in claim 2 further comprising, an electrical control circuit including timing switches operated by a motor driving the oscillatable table, the circuit further including the photocell detector and control members for selectively connecting the fluid passage to vacuum or fluid pressure and to control the clutch of the feed motor.

4. A machine as defined in claim 1 wherein the sorter is a tree-type sorter with at least 32 sorting bins controlled by sorting solenoids and further comprising an electrical control circuit including a shaft encoder, holding relays, and sorting relays, all electrically connected between the peak detector and the sorting solenoids.

5. A machine as defined in claim 4 further comprising, an error detecting circuit connected to the sorting solenoids to determine whether sorting gates of the sorting bins have been moved when the sorting solenoids are energized, the error detecting circuit including switches mechanically operated by members connected to the sorting gates.

6. A machine as defined in claim 1 further comprising means operable after the wafer blank is fed to the mounting station by said feed means for tapping the blank into position at the mounting station.

7. A machine as defined in claim 6 wherein the tapping means includes a tapping plate actuatable by a rotary solenoid at a selected time in a machine cycle.

8. A machine as defined in claim 1 further comprising an accurate adjustable means for determining the absolute angles of the arc through which the oscillatable table is driven including a micrometer positioned between said oscillatable table and an oscillatable drive member.

References Cited
UNITED STATES PATENTS 2,895,612  7/1959  Wise _____________ 209—111.5
3,240,332  3/1966  Grunwald _________ 209—75

M. HENSON WOOD, Jr., *Primary Examiner.*
R. A. SCHACHER, *Assistant Examiner.*